May 9, 1939.  C. W. HALLER  2,158,044

METHOD OF MAKING CONTACTOR BASES FOR ELECTRIC LAMPS, TUBES, AND THE LIKE

Filed Nov. 30, 1935  3 Sheets-Sheet 1

Cyrus W. Haller
INVENTOR

BY John J. Rogan
ATTORNEY

May 9, 1939.   C. W. HALLER   2,158,044
METHOD OF MAKING CONTACTOR BASES FOR ELECTRIC LAMPS, TUBES, AND THE LIKE
Filed Nov. 30, 1935   3 Sheets-Sheet 2

Cyrus W. Haller
INVENTOR

BY John J. Rogan
ATTORNEY

May 9, 1939.                C. W. HALLER                2,158,044
METHOD OF MAKING CONTACTOR BASES FOR ELECTRIC LAMPS, TUBES, AND THE LIKE
Filed Nov. 30, 1935         3 Sheets-Sheet 3
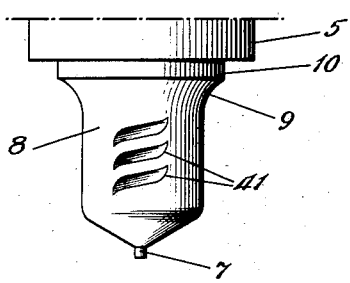
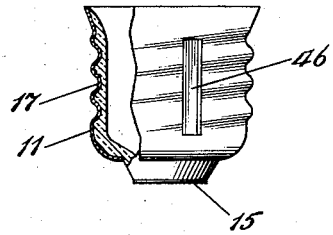
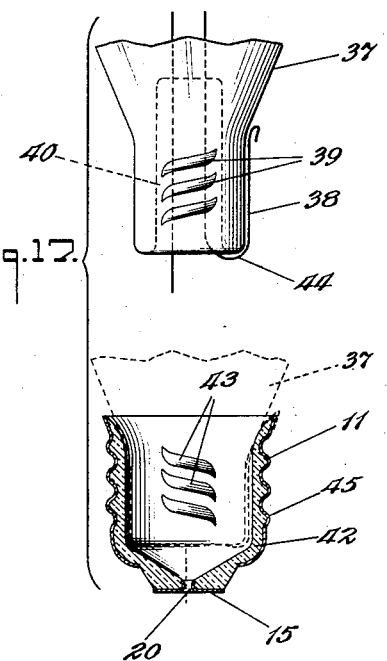
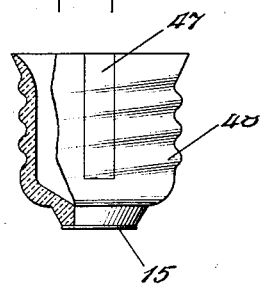
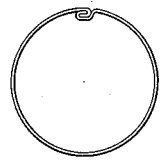
Cyrus W. Haller
INVENTOR
BY John J. Rogan
ATTORNEY Patented May 9, 1939

2,158,044

UNITED STATES PATENT OFFICE 2,158,044

METHOD OF MAKING CONTACTOR BASES FOR ELECTRIC LAMPS, TUBES, AND THE LIKE

Cyrus W. Haller, Marblehead, Mass., assignor to Hygrade Sylvania Corporation, Salem, Mass., a corporation of Massachusetts Application November 30, 1935, Serial No. 52,286

2 Claims. (Cl. 18—59)

This invention relates to contactor bases and more particularly to bases for electric lamps, radio tubes and similar devices.

A principal object of the invention relates to an improved lamp or tube base as well as to an improved method of manufacture thereof.

Heretofore in the manufacture of incandescent electric lamps of the conventional screw-base type, the base consists of a previously threaded metal shell insulatingly carrying at the bottom a metal contact button. This button is usually insulated from the shell by a relatively shallow vitreous cup-like ring which is fused to the shell and to the contact button. The finished base is then usually cemented to the lamp bulb by a relatively narrow ring of cement, thus leaving the greater part of the inner face of the shell exposed. When such a base is employed in connection with a fused lead-in wire there is considerable danger of the gases and vapor released by the blowing of the fuse, causing a destructive arc within the base. There is disclosed in application Serial No. 40,871, filed September 17, 1935, a method of protecting the normally exposed inner face of the shell by extending the glass skirt upwardly. Accordingly, another object of the present invention is to provide an improved method of insulating substantially the entire inner face of the usual threaded metal contactor base, while at the same time improving the mechanical construction and appearance of the base.

Another object is to provide a method of manufacturing a contactor base for electric lamps, radio tubes and the like whereby greater dimensional accuracy in the finished product may be attained.

A further object relates to the manufacture of a threaded base for electric lamps, radio tubes and the like, employing an improved method of molding the metal threads. In accordance with this object, I have found it possible to form a lamp or tube base with a threaded metal contact supported or imbedded in insulating materials which have not been found practicable heretofore for this purpose. Among such materials may be mentioned ceramics, plastic and thermoplastic insulators, Bakelite and similar phenolic condensation products. As a result of my process, it is possible therefore to make contact bases for lamps, tubes and similar electric devices employing an insulator which does not chip or crack as is very often the case with the usual glass insulator commonly used in lamps and the like. As a result of my improved process, it is also possible to manufacture readily, screw-bases either with a continuous, a discontinuous or mutilated external metal thread, or with any other form of thread required for special purposes such for example as identification purposes, theftproof purposes and the like.

A feature of the invention relates to an improved form of screw-thread base for electric lamps, radio tubes and the like, which lends itself very readily to the incorporation of special identifying marks, such as trade-marks, artistic designs, without weakening the base mechanically or otherwise interfering with its function as an electrical contactor.

A further feature relates to a cup-like contactor base for electric lamps, radio tubes and the like which permits higher voltages being employed without danger of short circuiting either interiorly or exteriorly of the base.

A still further feature relates to the novel organization, arrangement and relative location of parts which go to make up an improved and highly efficient yet cheaply manufacturable contactor base for electric lamps, radio tubes and the like.

Other features and advantages not specifically enumerated will be apparent after a consideration of the following detailed descriptions and the appended claims.

While the invention will be described herein in connection with the manufacture of a screw-base for lamps, it will be understood that the base is equally well adaptable to radio tubes, resistors, fuses, plugs and similar electric devices which are designed to be connected into the conventional screw-threaded lamp socket or the like. Accordingly in the drawings, Fig. 1 is a vertical cross-sectional view of a typical molding device for carrying out the method according to the invention.

Fig. 16 is a view of a modified form of die that may be used in the manufacture of bases for certain types of mechanically based bulbs.

Fig. 17 is an exploded view of a bulb and its cooperating base formed in accordance with the invention and using the die of Fig. 16.

Fig. 18 shows a base similar to the base of Figs. 1 and 2 and provided with a locking recess therein.

Fig. 19 shows a modification of the base of Fig. 14.

Fig. 20 shows a modification of the shell blank of Fig. 3.

Figure 1:
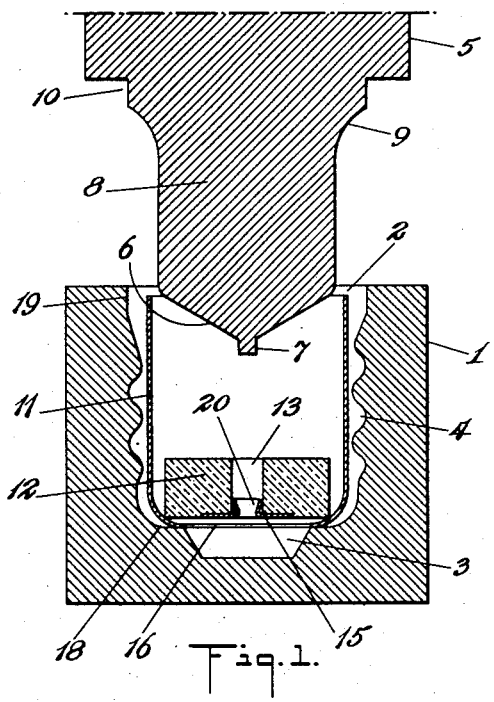
Figure 2:
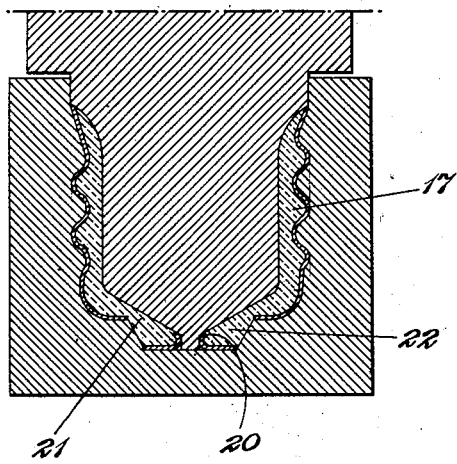
Fig. 2 is another view of the apparatus of Fig. 1 showing the molding die in its molding position.

Referring to Figs. 1 and 2, the numeral 1 represents a mold made of any suitable material and is provided with a substantially cylindrical smooth-faced mold cavity 2 the bottom of which is recessed as indicated by the numeral 3, and the cylindrical wall of which is provided with a round screw-thread 4. Preferably the thread 4 is designed so that when the base is formed as described below, the base threads are of the pitch and shape ordinarily employed on incandescent lamp bases. The mold 1 may be of one piece but is preferably of two pieces suitably fastened together. Co-operating with the mold 1 is a specially shaped die or plunger having its forward end tapered as indicated by numeral 6 and terminating in a cylindrical tip 7. The main body portion 8 of the die is preferably cylindrical and joins a flared portion 9, which in turn joins a shouldered portion 10. The cylindrical portion 8 is of smaller diameter than the inside diameter of the mold cavity, the difference in diameters depending upon the thickness of the insulation wall desired in the finished base. Any well-known form of heating means (not shown) may be provided for bringing the mold to the proper temperature.

Figure 5:
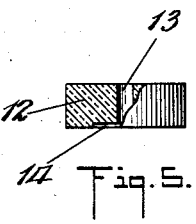
Fig. 5 is a partial sectional view of a pellet of the insulation material that is used to form the insulating wall of the base.
Figure 7:
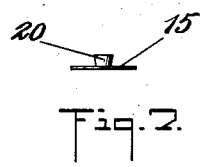
Fig. 7 is an elevational view of the eyeleted metal contact button.
Figure 6:
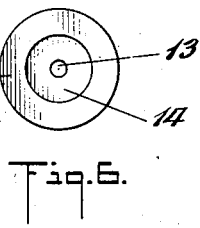
Fig. 6 is a bottom plan view of the pellet of Fig. 5.
Figure 8:
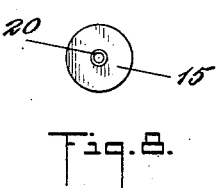
Fig. 8 is a bottom plan view of Fig. 7.

In order to form the base, there is positioned within the mold cavity a thin-walled metal shell or cup 11 (Figs. 3 and 4) of brass or other suitable metal such as is ordinarily employed in the manufacture of screw-bases for incandescent lamps. After the metal shell is placed in the mold, a cylindrical pellet 12 (Figs. 5 and 6) of a suitable heat-hardening plastic insulation material may be employed. As examples of materials that are useful for this purpose may be mentioned, powdered Bakelite or similar condensation product either alone or mixed with a ceramic powder, asbestos powder or the like. If desired the pellet may consist entirely of a suitable compressed powdered ceramic such as porcelain, Isolantite or the like, to which has been added a heat-hardening binder which becomes plastic when subjected to the molding pressure. Preferably, although not necessarily, the pellet is provided with a central opening 13, and the bottom face of the pellet is recessed at 14 to receive the usual eyeleted metal button 15. When the mold is heated to the proper temperature the die is moved downwardly and subjected to a suitable pressure to cause the pellet to become plastic and fill the space between the die and the inner face of shell 11. At the same time, the die forces the button 15 down against the button of recess 3 and also forces a quantity of the plastic insulation through the circular opening 16 in shell 11 causing this insulation to assume the shape of the said recess as shown clearly in Fig. 2. The pellet is so proportioned in volume that when the die reaches its lower-most position as shown in Fig. 2, there is a sufficient quantity of the plastic insulation to provide the desired thickness to the wall 17. It will be understood that when the die first engages the pellet it causes the shell 11 to be firmly held against the portion 18 of the mold so that further downward movement of the die forces the plastic insulation upwardly between the die face and the shell. Furthermore the close fit between the shoulder 10 on the die, and the cylindrical wall-portion 19 of the mold, prevents the plastic insulation from being forced upwardly beyond the rim of shell 11.

I have found that if the shell 11 is of sufficiently thin metal stock, the die pressure is transmitted through the insulation 17 to cause the wall of the shell to conform itself to the threaded surface of the mold, consequently the shell is formed with the screw-thread at the same time that a corresponding thread in the insulating wall 17 is formed. Preferably the die tip 7 is of about the same length as the eyelet 20 so that the die engages the rim of the eyelet and prevents the plastic insulation from flowing through the eyelet. When the base has been formed as described, the die is removed and the insulation is allowed to harden whereupon the two halves of the mold may be opened and the finished base removed. The base will then be found to consist of an internal cup-like insulating shell the outer surface of which is appropriately threaded and the correspondingly threaded metal shell 11 is in intimate bonding contact with the insulating shell over its entire threaded area. The contact button 15 is also bonded to the insulating shell and the eyelet 20 is accurately centered on the vertical axis of the base. Also the insulating shell is formed with a smooth conically inclined wall 21 communicating with the eyelet, and the slant of wall 21 may be such as to facilitate the insertion of the usual lead-in wire through the eyelet thus enabling the base to be conveniently used on any well-known type of automatic machine for applying the base to a suitable lamp or tube bulb.

From the foregoing it will be seen that by choosing a suitable insulation material for the pellet 13 it is possible to impart a very pleasing appearance to the finished base as the insulation may be made in any desired color or combination of colors. Furthermore it is possible to form the base with greater accuracy than is possible where a prethreaded metal shell is employed and fastened to the eyeleted button by the usual shallow glass ring. It is also possible by this method of base formation to employ insulating materials which are not adaptable to the usual methods of forming bases. Thus it is possible to produce a base wherein the exteriorly exposed portion of the insulation is substantially chipproof. Furthermore the portion 22 being integral with the wall portion 17 provides a rigid support for the shell 11 both against vertical as well as against radial crushing. It will be understood of course that if desired the recess 3 in the mold may be made as deep as is found necessary to provide the requisite spacing between the lower rim of shell 11 and the metal button 15.

Figure 9:
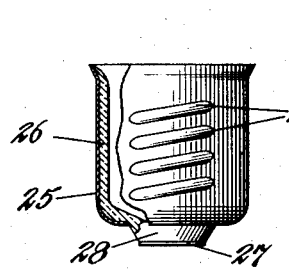
Fig. 9 shows a modified form of screw-thread base according to the invention.
Figure 10:
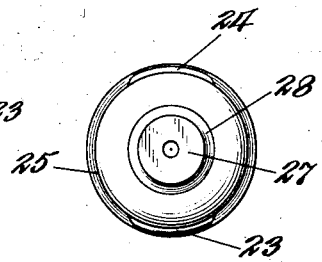
Fig. 10 is a bottom plan view of Fig. 9.

The above-described method of forming contactor bases has the additional advantage that it is possible to provide the base with discontinuous or sector threads instead of continuous threads. Thus the mold instead of having its molding face provided with a continuous thread may be provided with a series of spaced thread-sectors so that the finished base will be as shown for example in Figs. 9 and 10 wherein the metal shell is formed with a series of thread-sectors 23 on one side and a similar series of thread-sectors 24 on the opposite side it being understood that the sectors are in effect sectors of what would otherwise be a single continuous thread such as is shown for example in Figs. 2 and 14, the intermediate unthreaded portion of both the metal shell 25 and the insulator shell 26 being cylindrical. The eyeleted metal contact button 27 is integrally bonded to the extension 28 of the insulator shell as described in connection with Figs. 1 and 2.

Figure 11:
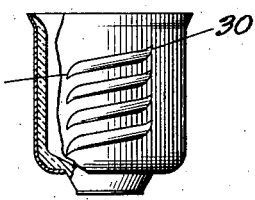
Fig. 11 shows a further modification of the base.

If desired the thread sectors may be so formed during the molding process that the base is capable of being turned radially in one direction in to the usual threaded socket but is incapable of being turned in the opposite direction. Thus as shown in Fig. 11 the thread sectors are formed with pointed inclined ends 29, 30 which do not interfere with the rotation of the base into the usual threaded socket, but which lock against the socket threads when the base is turned to remove it from the socket. It will be understood of course that the base may be molded with any other form of mutilated thread, and while the drawing shows each turn of the usual thread formed in two sectors a greater or less number of sectors may be formed.

Figure 12:
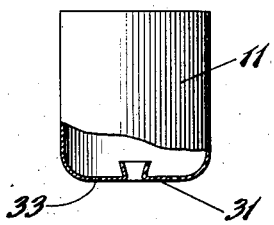
Fig. 12 shows a modified form of shell blank that may be used in place of the blank of Fig. 3.
Figure 13:
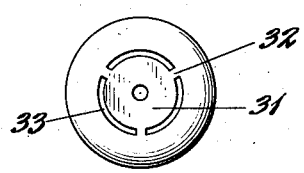
Fig. 13 is a bottom plan view of Fig. 12.

Instead of employing a button such as button 15 separate from the shell in the molding process the shell may have its base slotted as shown in Figs. 12 and 13 so that the central portion 31 can be separated from the shell by the downward movement of the die and this portion 31 seats itself in the recess 3. In this embodiment the ribs 32 should of course be as narrow as possible so as to insure the proper separation of the shell and button portion. If desired, instead of using slits 33, the bottom of the shell may be provided with a circular series of closely spaced perforations.

Figure 3:
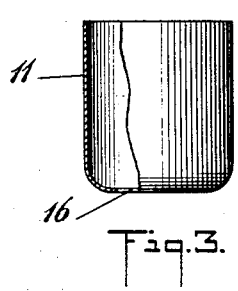
Fig. 3 is a partial sectional view of a typical form of thin-walled metal shell that is used with the molding device of Figs. 1 and 2.
Figure 4:
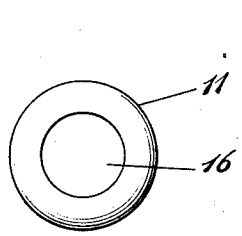
Fig. 4 is a bottom plan view of Fig. 3.
Figure 14:
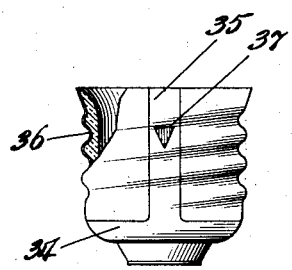
Fig. 14 shows a still further modification of the base.
Figure 15:
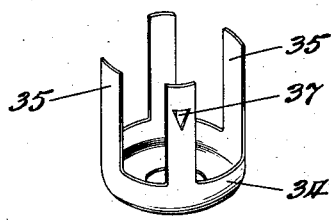
Fig. 15 is a perspective view of the shell blank that is used in producing the base of Fig. 14.

Instead of employing a metal shell in the form of a complete cylinder as shown in Figs. 3 and 12, the shell may be made in skeleton form such as shown in Fig. 15 comprising a rim 34 formed with a set of spaced strips 35. The manner of using this skeleton shell is the same as that described in connection with Figs. 1 and 2 and the finished base thus produced is shown in Fig. 14. In this embodiment the vertical strips 35 are imbedded in the insulation shell 36 and each strip is molded at the same time the insulation shell is formed so that both the shell and the strips have the required threads therein. It will be obvious that instead of employing the strips 35 as integral extensions of the rim 34 the strips alone may be employed and held in the mold in any suitable manner in circumferentially spaced relation so that when the insulation pellet is subjected to heat and pressure the strips imbed themselves in the molded insulation shell, and are flush with the outer face of the insulation shell.

If desired the metal shell of Figs. 3, 12 or 15 may have part of its wall cut out to form an identifying configuration so that when the metal shell and insulation shell are molded to shape, the insulation fills the cut-out portion. Thus as shown in Fig. 15 one of the strips 35 is provided with a triangular cut-out 37 through which appears conspicuously the insulation in the finished base as shown in Fig. 14.

In the foregoing embodiments of the invention the insulator portions 21, 26 etc. are molded with a substantially smooth inner surface and the bases are capable of being fastened to the lamp or bulb by a bonding cement or the like in the usual manner. However, the process is also applicable to the control of the configuration of the internal surface as well as the external surface of the insulator shell. For example in lamps of the so-called mechanically based type, the portion of the lamp bulb adjacent the seal may be provided with integral screw threads, depression, beads or the like which are arranged to interlock with corresponding threads, depressions, beads etc., on the internal surface of the metal shell base. Examples of such mechanically based lamps are illustrated in application Serial No. 731,581, filed June 21, 1934. Referring to Figs. 16 and 17 a description will be given of the manner of applying the process to the manufacture of one illustrative form of mechanically based bulb. As shown in Fig. 17, the bulb 37 has its butt portion 38 provided with raised thread sectors 39 preferably, although not necessarily, of the configuration shown. While the drawings show only one set of thread sectors, it will be understood that a similar set or sets may be provided around the periphery of the butt 38 and these sectors may, if desired, be molded at or during the operation of sealing the reentrant stem 40 into the bulb. The base which is shown in section in the lower part of Fig. 17 may be similar to the bases shown in Figs. 2, 9, 11, 14, 18 or 19 and may be manufactured in accordance with the process described in detail in connection with Figs. 1 and 2. The only difference is that in place of the smooth-faced die 8, there is employed a die such as shown in Fig. 16 which has its cylindrical face provided with recessed thread sectors 41 to correspond to the thread sectors 39 on the lamp butt 38, thus forming the insulator shell 42 with correspondingly raised sectors 43. The base may then be threaded on to the butt 38 and fastened in any suitable manner. Thus the lead-in wire 44 may be bent back upon itself and the free end soldered to the rim of the metal shell 45. It will be obvious that instead of molding the internal face of the insulator shell 42 with thread sectors the die may have its cylindrical face formed with a continuous recessed plural turn screw-thread and the butt 38 may likewise be provided with a continuous plural turn raised screw-thread with a transverse slot to receive the bent back lead-in wire 42 in the manner illustrated for example in Patent No. 1,650,289 to J. B. McGinley. In carrying out the process in connection with the type of base shown in Fig. 17, it may be necessary to make the die in sectors which may be collapsed or removed in order to allow for the removal of the finished base from the die. It will be understood of course that the embodiment of Fig. 17 is merely illustrative of one particular configuration for the internal wall of the insulator shell.

In certain cases, it is desirable to provide a bulb with a base that is capable of receiving a locking member when the bulb is inserted in the receptacle. Thus as shown in Fig. 18 the base which may be of any of the forms disclosed in the preceding figures has its external threaded surface molded with a recess or slot 46 to receive a locking screw or projection (not shown) for preventing the bulb being removed from its threaded receptacle in the ordinary manner. In making the type of base shown in Fig. 18, it will be understood that the internal face of the mold will, in addition to being provided with the molding threads, also be provided with a projection to form the recess 46 or any other suitably shaped recess.

Instead of employing a cylindrical shell or skeleton shell (Fig. 15) the side contact of the base may consist of a simple strip of metal 47 which may be held in the mold in any convenient manner so that when the die forces the plastic insulation to shape, the strip will be embedded in the plastic and the base will consist for the most part of an externally threaded shell 48 of the insulation having imbedded in its outer face the correspondingly threaded metal strip 47. Instead of employing a seamless metal shell 11 (Figs. 3 and 13) for forming the base, this shell may be made from a strip of the metal having its edges overlapped as indicated in Fig. 20.

As an alternative method the metal shell 11 may be omitted and after the insulation is molded to the desired formation with the button or eyelet 20 thereon, as described in connection with Figs. 1 and 2, the desired portion or portions of the outer surface of the molded insulator shell may be provided with a coating of conductive material as by spraying, dipping, electrolytic deposition, painting or the like.

It will be understood that the invention is not limited to the use of metal sheet stock for the shells 11, 25, 34 and that the metal mesh, perforated metal or any form of foraminous metal stock may be employed. Other changes and modifications may be made in the embodiments disclosed, without departing from the spirit and scope of the invention.

An application Serial No. 267,025 was filed April 10, 1939, as in part a continuation of the present application.

What I claim is:

1. The method of making a contactor base for electric devices which includes the steps of supporting an unthreaded thin-walled cylindrical blank metal shell within an internally threaded mold, attaching a metal eyelet to the surface of a cylindrical pellet of compressed powdered heat hardening moldable insulation, placing the pellet in the shell in the mold in a position such that the pellet is supported by the shell and spaced from the bottom of the mold, the eyelet being at the bottom of the pellet, forcing a die into the mold into pinning engagement with the eyelet to center the latter and to force the insulation against the shell and to force the shell against the thread of the mold to produce screw threads in the shell, heating said insulation to its heat-hardening temperature and afterward removing the moulded contactor base from the mold.

2. The method of making a contactor base for electric lamps which includes the steps of compressing a charge of powdered, heat-hardening, moldable insulation to form an annular ring of said insulation, affixing an annular metal eyelet to the outside surface of said ring and with its axis in register with the axis of said ring, supporting a thin walled metal shell within an internally threaded mold, supporting the eyeleted ring of insulation loosely in the metal shell so that the eyeleted side is toward the closed end of the mold but spaced from the bottom of the mold, and forcing a die into the mold to center said eyelet in position and to force the insulation against the metal shell and to conform the shell to the screw thread shape of the mold, and heating the insulation with the die in place to the hardening temperature of the insulation to fix permanently the shape of the latter.

CYRUS W. HALLER.